(12) United States Patent
Block

(10) Patent No.: US 7,057,549 B2
(45) Date of Patent: *Jun. 6, 2006

(54) METHOD AND APPARATUS FOR PREDICTIVE ALTITUDE DISPLAY

(75) Inventor: Gerald J. Block, Rancho Santa Fe, CA (US)

(73) Assignee: Sandel Avionics, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/076,794

(22) Filed: Mar. 9, 2005

(65) Prior Publication Data

US 2005/0248481 A1 Nov. 10, 2005

Related U.S. Application Data

(63) Continuation of application No. 10/700,323, filed on Nov. 3, 2003, which is a continuation of application No. 10/300,167, filed on Nov. 19, 2002, now Pat. No. 6,683,556, which is a continuation of application No. 09/976,260, filed on Oct. 11, 2001, now Pat. No. 6,489,916.

(60) Provisional application No. 60/239,319, filed on Oct. 10, 2000.

(51) Int. Cl.
*G01S 13/94* (2006.01)

(52) U.S. Cl. .................... 342/65; 342/179; 342/120; 342/121; 342/181

(58) Field of Classification Search .............. 342/65, 342/176, 179–183, 197, 120–123; 340/955, 340/945, 970; 701/4
See application file for complete search history.

(56) References Cited

U.S. PATENT DOCUMENTS 3,668,623 A * 6/1972 Csaposs ..................... 340/976

| 4,063,073 | A |   | 12/1977 | Strayer |
|---|---|---|---|---|
| 4,071,843 | A | * | 1/1978 | Marien ........................ 342/55 |
| 5,355,442 | A |   | 10/1994 | Paglieroni et al. |
| 5,448,233 | A | * | 9/1995 | Saban et al. ................ 340/963 |
| 5,448,241 | A | * | 9/1995 | Zeoli et al. ............... 342/25 A |
| 5,839,080 | A |   | 11/1998 | Muller et al. |
| 5,936,552 | A | * | 8/1999 | Wichgers et al. .......... 340/963 |
| 6,038,498 | A | * | 3/2000 | Briffe et al. ................... 701/3 |

(Continued)

OTHER PUBLICATIONS

"Digital terrain systems", Fountain, J.R. Airborne Navigation Systems Workshop (Digest No. 1997/169) Feb. 21, 1997 pp.:4/1-4/6.*

(Continued)

*Primary Examiner*—John B. Sotomayor
(74) *Attorney, Agent, or Firm*—Mayer & Williams PC; Mark D. Wieczorek, Esq.

(57) ABSTRACT

Embodiments of the invention provide a method and apparatus for indicating aircraft height relative to an obstruction in a terrain awareness warning system. The method includes receiving data indicative of geographic features of an obstruction, lateral distance of the geographic feature from an aircraft, height and flight path of the aircraft, calculating a projected height of the aircraft at the location of the obstruction using the data, generating a result signal, and displaying a colored indication on a display screen based on the result signal. The apparatus includes inputs for signals from instruments measuring height, flight path, and location of an aircraft, as well as an input for an instrument providing information about geographic features of terrain surrounding the aircraft. The apparatus includes a means for employing the signals to calculate an effective height of the aircraft relative to the terrain, and a screen display for graphically displaying the results of the calculation.

20 Claims, 7 Drawing Sheets

U.S. PATENT DOCUMENTS

| | | | |
|---|---|---|---|
| 6,043,758 A * | 3/2000 | Snyder et al. | 340/970 |
| 6,092,009 A * | 7/2000 | Glover | 701/14 |
| 6,122,570 A | 9/2000 | Muller et al. | |
| 6,138,060 A | 10/2000 | Conner et al. | |
| 6,219,592 B1 | 4/2001 | Muller et al. | |
| 6,489,916 B1 | 12/2002 | Block | |
| 6,683,556 B1 | 1/2004 | Block | |
| 6,946,976 B1 * | 9/2005 | Langner et al. | 340/971 |
| 6,957,130 B1 * | 10/2005 | Horvath et al. | 701/3 |
| 6,970,104 B1 * | 11/2005 | Knecht et al. | 340/945 |
| 2001/0056316 A1 * | 12/2001 | Johnson et al. | 701/14 |
| 2002/0089432 A1 * | 7/2002 | Staggs et al. | 340/945 |
| 2002/0126040 A1 * | 9/2002 | Block | 342/65 |
| 2003/0132876 A1 * | 7/2003 | Block | 342/65 |
| 2005/0007270 A1 * | 1/2005 | Block | 342/65 |

OTHER PUBLICATIONS

"Developmental flight testing of a digital terrain system for the USAF F-16", Coleman, G.; Seelos, M.; McAllum, S., Aerospace Conference, 1999. Proceedings. 1999 IEEE vol. 3, 1999 pp.:99-110.*

* cited by examiner

METHOD AND APPARATUS FOR PREDICTIVE ALTITUDE DISPLAY

CROSS-REFERENCE TO RELATED APPLICATIONS

This is a continuation of U.S. patent application Ser. No. 10/700,323, filed Nov. 3, 2003, entitled "METHOD AND APPARATUS FOR PREDICTIVE ALTITUDE DISPLAY," which is a continuation of U.S. patent application Ser. No. 10/300,167, filed Nov. 19, 2002, entitled "METHOD AND APPARATUS FOR PREDICTIVE ALTITUDE DISPLAY," now U.S. Pat. No. 6,683,556, which is a continuation of U.S. patent application Ser. No. 09/976,260, filed Oct. 11, 2001, entitled "METHOD AND APPARATUS FOR PREDICTIVE ALTITUDE DISPLAY," now U.S. Pat. No 6,489,916, which is a continuation-in-part and claims the benefit of U.S. Provisional Patent Application Ser. No. 60/239,319 filed Oct. 10, 2000, entitled "TERRAIN AWARENESS AND WARNING SYSTEM (TAWS) FOR AIRCRAFT." All of the above-mentioned prior applications are incorporated herein by reference in their entireties.

FIELD OF THE INVENTION

The present invention relates to avionics, and more particularly to altitude displays and terrain awareness warning systems.

BACKGROUND OF THE INVENTION

A conventional altitude display for a terrain awareness warning system (TAWS) for a given aircraft provides a pilot with a visual display of the terrain having an altitude higher than the aircraft, as well as the terrain within some distance, usually 2000', below an aircraft.

Referring to prior art FIG. 1, an environment is shown in which a conventional altitude display could be important. In situation I, an aircraft 12 is flying at an altitude X along a direction vector 16. In situation II, an aircraft 12' is flying at an altitude X' along a direction vector 16'. In situation III, an aircraft 12" is flying at an altitude X" along a direction vector 16". Finally, in situation IV, an aircraft 12'" is flying at an altitude X'" along a direction vector 16'". The aircrafts 12, 12', 12", and 12'" are flying with direction vectors 16, 16', 16", 16'", respectively, such that an obstruction 14 having height Y is within a forward arc, centered on the respective direction vector, as monitored by the conventional altitude display aboard each respective aircraft.

Starting by considering situation IV, a conventional altitude display would typically give a visual signal as the height Y of the obstruction 14 is greater than the altitude X'" of the aircraft 12'". In other words, $X''' \leq Y$. An audible alert may be given as well if suitable criteria regarding time-to-impact of the terrain feature are also met. In all cases, the height Y and altitude X'" may be measured by radio height, altitude above sea level, or other means, and preferably the same type of measurement, is employed for both distances. The visual signal in this situation would typically be a red area, such as a spot or square, on a cockpit display. The term 'RED' is shown in the figure to denote the range of operation which would result in a red area being displayed.

The red area would be indicated to be at a range Z and at a bearing corresponding to the direction of the obstruction 14 relative to the centerline of the aircraft 12'".

In situation III, a conventional altitude display would also typically give a red visual signal as the height Y of the obstruction 14 is within a predetermined elevation buffer "D" and within a predetermined time-to-impact from the altitude X" of the aircraft 12". This elevation buffer D is typically 700' or 1000' during enroute navigation, and the alert would be given if $X''-Y \leq D$. As before, the red area would be indicated to be at a range Z and at a bearing corresponding to the direction of the obstruction 14 relative to the centerline of the aircraft 12". Also as before, an audible signal may also be given if certain criteria are met.

In situation II, a conventional altitude display would typically just display a visual signal as the altitude X' of the aircraft 12' is greater, than the predetermined elevation buffer D from the height Y of the obstruction 14, by a first distance $d_1$. In other words, $X'-Y \geq D+d_1$. $d_1$ is also typically 1000'. The aircraft 12' would not be considered to be completely free of the obstruction 14, however, and for this reason the visual signal would be of a cautionary nature. The visual signal would typically be a yellow area, such as a spot or square, on the cockpit display. As such, 'YELLOW' indicates this range. As with the red areas, the yellow area would be indicated to be at a range Z and at a bearing corresponding to the direction of the obstruction 14 relative to the centerline of the aircraft 12'.

Finally, in situation I, a conventional altitude display would typically just display a visual signal as the altitude X' of the aircraft 12' is greater than the height Y of the obstruction 14 by not only the elevation buffer D and the first distance $d_1$, but also by a second distance $d_2$. In other words, $X'-Y \geq D+d_1+d_2$. $d_2$ is again typically 1000'. The aircraft 12 would be considered to be mostly free of the obstruction 14, however, and for this reason the visual signal would typically be a green area, such as a spot or square, on the cockpit display. Again, 'GREEN' indicates this range. As with the red and yellow areas, the green area would be indicated to be at a range Z and at a bearing corresponding to the direction of the obstruction 14 relative to the centerline of the aircraft 12.

At higher aircraft altitudes, no colored area, or a black area, would be indicated. Here, 'NONE' is shown in the figure to denote this range.

Such altitude displays are clearly useful for warning pilots of impending dangerous terrain. However, such systems fail to account for important factors such as the actual flight path of the aircraft. As a result, their accuracy may be less than desired. For example, if an aircraft is climbing, the above described prior art altitude display may report a red area where one is not warranted. In the same way, if an aircraft is high but descending, the above-described prior art altitude display may display a green area where a red area is warranted.

SUMMARY OF THE INVENTION

The present invention overcomes the disadvantages of the prior art noted above.

In one aspect, the invention is directed towards a method for providing an indication of aircraft height relative to an obstruction in a terrain awareness warning system. The method includes steps of receiving a first datum indicative of a geographic feature of an obstruction, receiving a second datum indicative of a lateral distance of the geographic feature from an aircraft, receiving a third datum indicative of a height of the aircraft, receiving a fourth datum indicative of a flight path of the aircraft, calculating a projected height of the aircraft at the location of the obstruction using the first through fourth data, generating a result signal based on the projected height and the first datum, and displaying a colored indication on a display screen based on the generated result signal.

Implementations of the method may include one or more of the following. The first datum may be a height of the obstruction. The colored indication may be a colored area on a display screen having a color such as red, yellow, green, or black. The elevation buffer may be zero. The receiving a fourth datum may further include resolving the flight path of the aircraft into components including a lateral flight path and a vertical flight path. The method may further include: calculating a flight path angle of the aircraft from the received fourth datum, calculating an effective altitude of the aircraft by adding to the third datum a value equal to the second datum multiplied by the tangent of the flight path angle, generating a first alert signal if the effective altitude is less than the sum of the first datum and a elevation buffer, sounding an audible alarm with the first alert signal, displaying a first colored indication at a display location corresponding to the second datum as the first alert signal, generating a second alert signal if the effective altitude is greater than the sum of the first datum and a elevation buffer but less than a sum of the first datum, the elevation buffer, and a first distance, or displaying a second colored indication at a display location corresponding to the second datum as the second alert signal.

In another aspect, the invention is directed towards a computer program, stored in a machine-readable format, for a terrain awareness warning system. The program causes a computer to: receive a first datum indicative of a geographic feature of an obstruction; receive a second datum indicative of a lateral distance of the geographic feature from an aircraft; receive a third datum indicative of a height of the aircraft; receive a fourth datum indicative of a flight path of the aircraft; calculate a projected height of the aircraft at the location of the obstruction using the first through fourth data; and generate a result signal based on the projected height and the first datum.

In yet another aspect, the invention is directed towards an apparatus for providing an indication of aircraft height relative to an obstruction in a terrain awareness warning system. The apparatus includes a first input for a first signal from an instrument measuring a height of an aircraft, a second input for a second signal from an instrument measuring a location of the aircraft, a third input for a third signal from an instrument providing information about geographic features of terrain surrounding the aircraft, and a fourth input for a fourth signal from an instrument measuring a flight path of the aircraft. The apparatus includes means for employing the signals from the first through fourth inputs to calculate an effective height of the aircraft relative to at least the third input, and a screen display for graphically displaying the results of the calculation.

Implementations of the apparatus may include one or more of the following. The instrument measuring height and location of the aircraft may include an altimeter. The instrument providing information about geographic features of terrain surrounding the aircraft, as well as the instrument measuring a flight path of the aircraft, may be aids to navigation, such as a global positioning system unit. The apparatus may further include a conventional TAWS altitude display and means to toggle the screen display between the conventional TAWS altitude display and the screen display for graphically displaying the results of the calculation. The first through fourth inputs may form at least a portion of a parallel data bus or a serial data stream.

In a further aspect, the invention is directed towards a method of performing terrain awareness warning for an aircraft. The method includes steps of collecting data about terrain features in the vicinity of an aircraft, collecting data of the lateral distance and bearing of the terrain features from the aircraft, collecting data of the height and flight path of the aircraft, calculating a projected height of the aircraft at the location of each of the terrain features based on the collected data of the height and flight path of the aircraft, and generating result signals based on the projected height, the collected data of terrain features, and the bearing of the terrain features. The method further includes displaying colored indications on a display screen, with respect to bearing, based on the generated result signals.

In still a further aspect, the invention is directed towards a method for providing an indication of lateral aircraft position relative to an obstruction in a terrain awareness warning system. The method includes steps of receiving a first datum indicative of the bearing of an obstruction relative to an aircraft, receiving a second datum indicative of a lateral distance of the obstruction from the aircraft, and receiving third data indicative of a flight path of the aircraft. The method further includes steps of calculating a projected flight path of the aircraft relative to the obstruction using the first through third data and determining a distance between the projected flight path and the obstruction at a series of points along the projected flight path. The method includes steps of generating a result signal based on the determined distance, and displaying a colored indication on a display screen based on the generated result signal with respect to the bearing.

Advantages of the invention may include one or more of the following. The invention allows for more accurate terrain displays, giving the pilot a more reliable indicator of the relative danger of forward terrain. The invention provides this increased accuracy in part by taking into account factors, such as the flight path angle of the aircraft, when calculating and displaying alerts. As a result, false warnings are eliminated and dangerous situations that would not have been noticed by prior systems are avoided.

Other advantages will be apparent from the description that follows, including the figures and the claims.

DETAILED DESCRIPTION OF THE PREFERRED EMBODIMENTS

Figure 1:
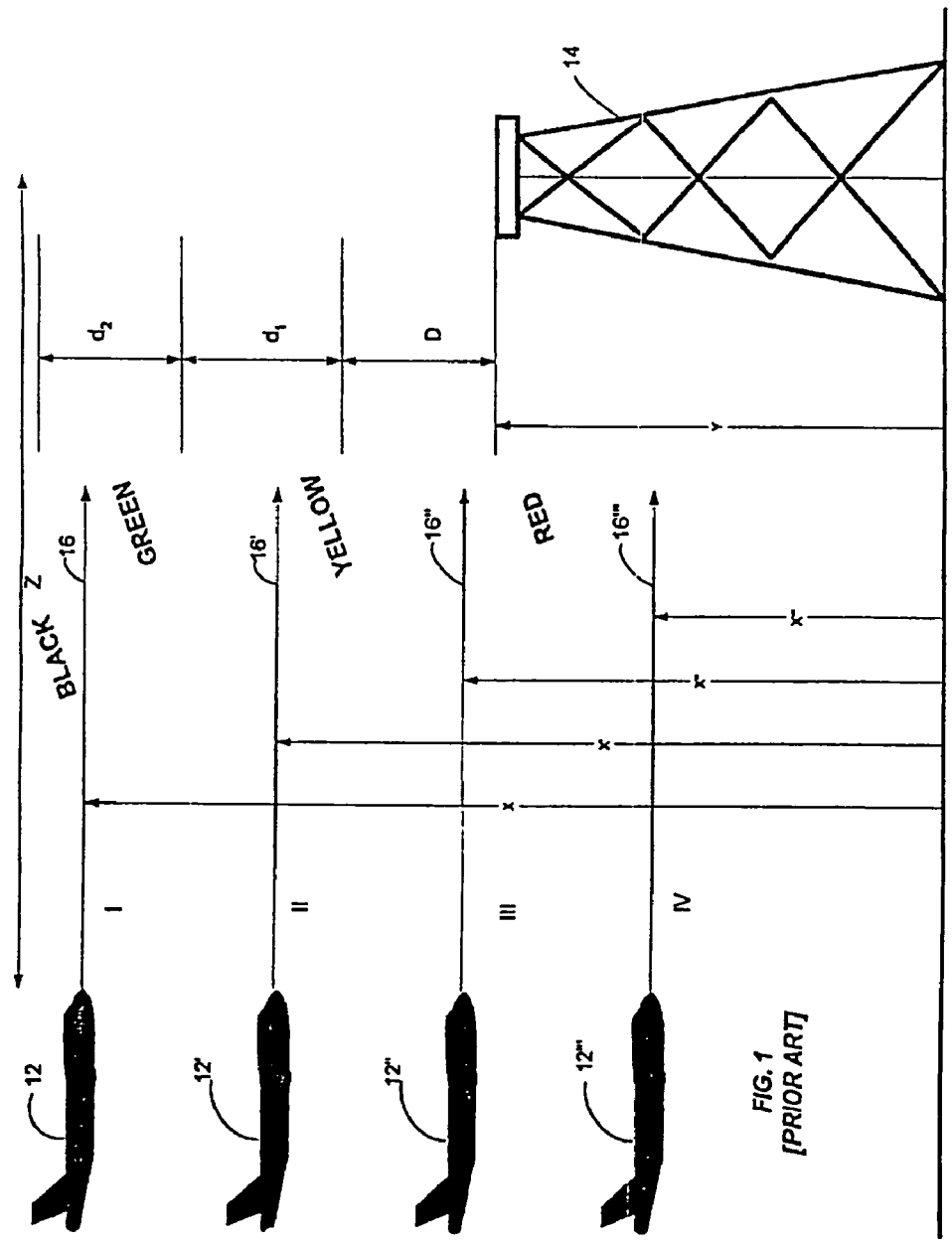
FIG. 1 is a schematic depiction of various scenarios of aircraft flight with respect to an obstruction.
Figure 2:
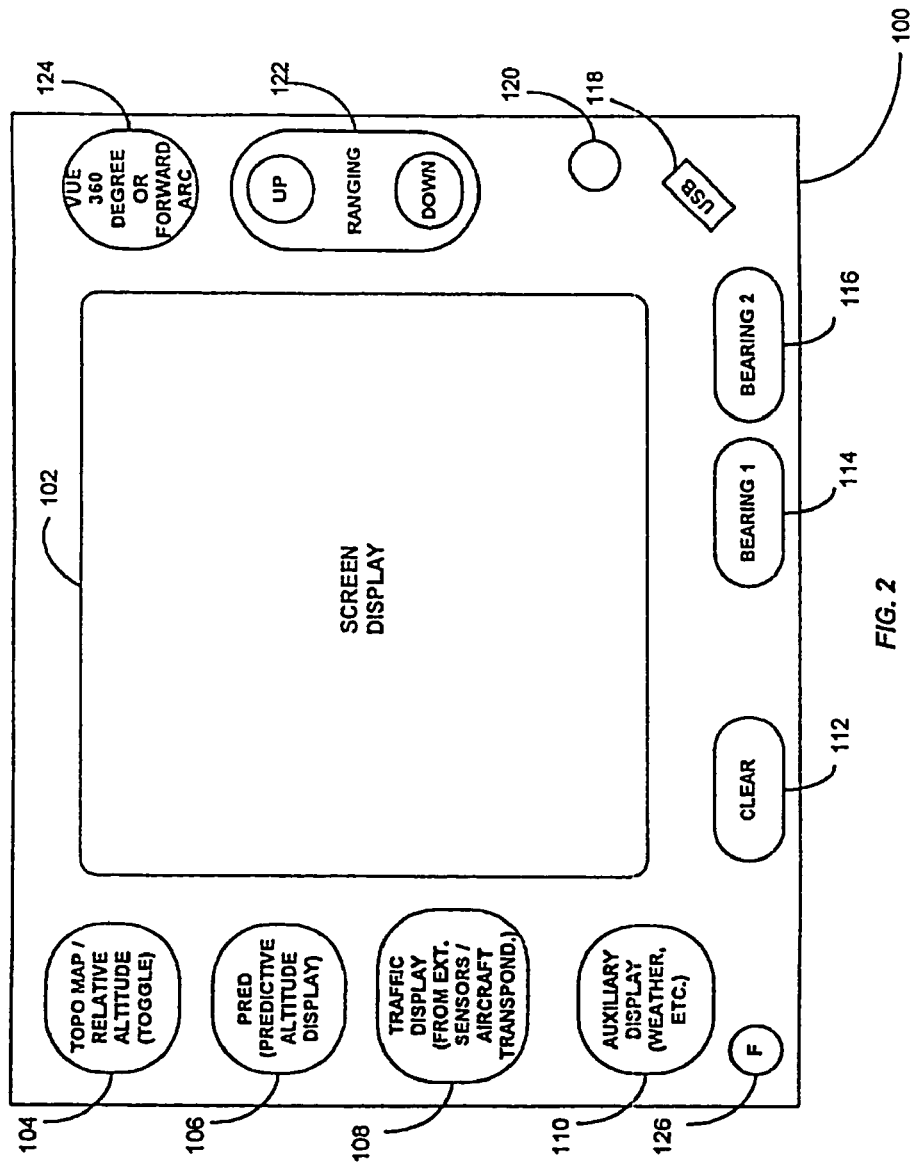
FIG. 2 is a schematic drawing of an apparatus according to an embodiment of the present invention, showing in particular the display and button layout.

Referring to FIG. 2, a display apparatus 100 for a terrain awareness (TAWS) system is shown that may incorporate the present invention. The display apparatus 100 employs a screen display 102, which may be an LCD rear projection screen such as that disclosed in U.S. Pat. No. 6,259,378, owned by the assignee of the present invention and hereby incorporated by reference in its entirety. The display apparatus 100 further includes various surrounding buttons and interfaces.

An exemplary layout for the display apparatus 100 will now be described. However, it should be appreciated that the particular button and function layout described below is merely an example and the invention is not limited thereto.

Upon depression of the toggle button 104, the screen display may toggle between a topographic display and a relative altitude display. Upon depression of the predictive altitude display ("PRED") button 106, the screen display 102 changes to the PRED display, which is described in greater detail below.

A traffic display button 108 may cause a display of local air traffic in the vicinity of the aircraft. This function may employ as inputs the sensor readings from transponders on aircraft operating within radio range of the subject aircraft. An auxiliary button 110 may display a variety of information, such as weather, ancillary navigational aids, and so on.

A function button 126 may be provided to allow the user to select more than the usual input or inputs from the various other buttons. For example, the function button 126 may be used to enhance the ability of the user to perform a setup of the apparatus. As another example, during an alert or warning, pressing the function button 126 may result in a muting of the alert or warning. Preferably, if an alert status were indicated, the display screen 102 would switch to a display of that function which would allow the pilot to most effectively find a solution to the situation. In many cases, the PRED function would be the most pertinent such display.

A light sensor 120 may be employed to automatically control the brightness and contrast of the screen display 102 for improved visibility. A micro-USB port 118 may be employed to allow an external input/output of data from the display apparatus 100. As explained in more detail below, various data, such as airport runway information, topographical data and runway approach data may be uploaded to the display apparatus 100 prior to use. It may be necessary to periodically update this information and use of the micro-USB port 118 may be used for this purpose, although other methods and apparatus are within the scope of the invention. For example, the data may be updated by wireless link.

Finally, a ranging button 122 may allow a zoom in or out of the display, and a VUE button 124 may toggle the display between a 360° display and a forward arc display of, e.g., 70°. Such choices may especially be useful for the functions invoked by buttons 104, 106, and 108.

Generally, in use, the display apparatus 100 receives data concerning the position of the aircraft, its ground track, lateral track, flight path, altitude, height off ground and other data. This data is compared with pre-stored data concerning terrain in the proximity of the aircraft as well as terrain that will be within proximity of the aircraft within a selected look ahead distance or time based on the projected flight path. The desired look ahead distance or time may be dynamically adjusted by the user or system. For example, the system may be set to a 10 second look-head, which would provide a display of terrain that the aircraft will come in proximity with in the next 10 seconds, based on the projected flight path, which may be calculated based on data including the current heading, air speed, ground track, etc. The system may adjust the look ahead distance/time based on phase of flight.

Terrain as used herein includes natural as well as man-made obstacles and topographical features. For example, tall buildings, tall wire towers and mountain ranges are all terrain as used herein.

Depending on the relationship (or projected relationship) of the aircraft to the terrain, the terrain may or may not be displayed on the display device 100. For example, if it appears that the aircraft will fly into or very close to the terrain, the terrain may be displayed in red on the display device 100 and/or an audible warning may be generated to alert the user of the danger if other appropriate criteria are met. For somewhat less threatening situations, the terrain may be displayed in yellow and/or an audible alert may be generated as above. For situations in which the aircraft is not in a threatening relationship to the terrain, the terrain may be displayed in green, and for terrain that is sufficiently distanced from the aircraft (either far below the aircraft flight path or far afield from it), the terrain may not be displayed.

Figure 3:
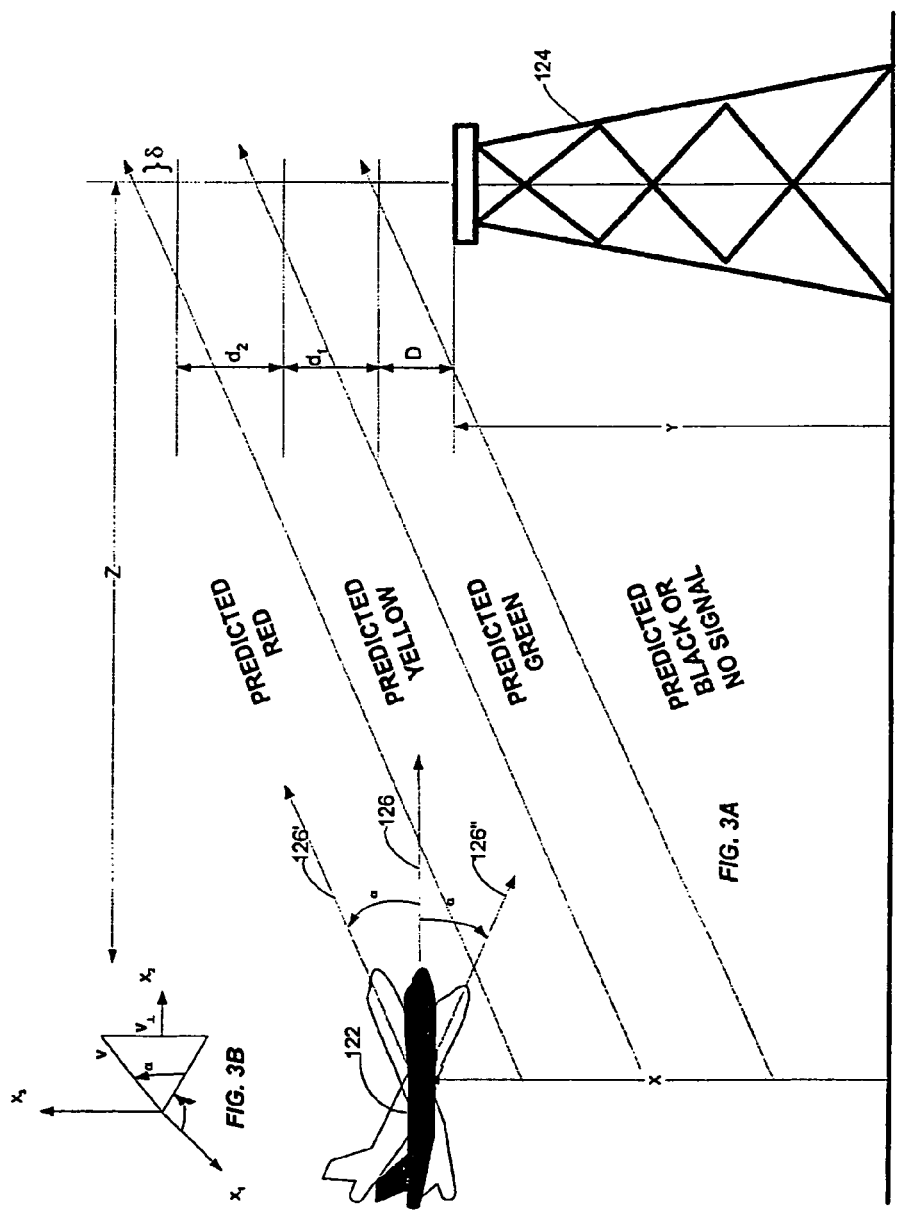
FIG. 3A is a schematic depiction of various scenarios of aircraft flight with respect to an obstruction, showing in particular the flight paths and accompanying alert situations according to an embodiment of the invention in which an aircraft has a positive flight path angle.
FIG. 3B is a schematic of a notation scheme, with accompanying axes, used to describe features of embodiments of the invention.

Referring now to FIG. 3A, a schematic depiction of a situation is given which may employ an embodiment of the present invention. In particular, an aircraft 122 having an altitude X has a flight path 126 which will take the aircraft 122 in the proximity of an obstruction 124. The obstruction 124 is of course schematic in nature and should be understood to encompass any terrain feature.

Figure 4:
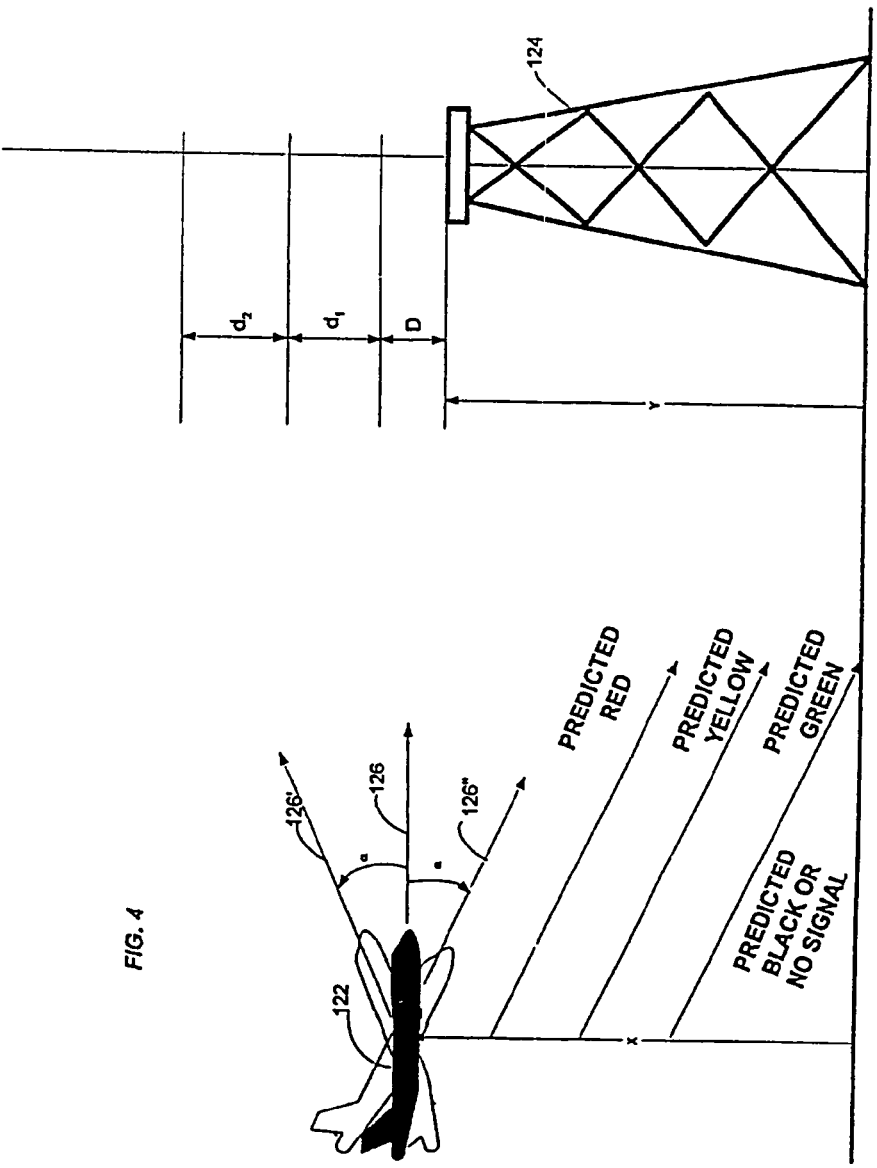
FIG. 4 is a schematic depiction of various scenarios of aircraft flight with respect to an obstruction, showing in particular the flight paths and accompanying alert situations according to an embodiment of the invention in which an aircraft has a negative flight path angle.

The aircraft 122 is shown with three different flight paths: a level flight path 126, an ascending flight path 126', and a descending flight path 126". The amount of ascent or descent is given by flight path angle $\alpha$. It will be clear that flight path angle $\alpha$ may be either positive (ascending, flight path 126') or negative (descending, flight path 126"). FIG. 3A primarily shows the effects of a positive flight path angle. The effects of a negative flight path angle are shown in FIG. 4.

In a conventional altitude display, each flight path 126, 126', and 126" would result in the same display, depending only on the values of X, Y, $d_1$, $d_2$, Z, and D as described above. In the present invention, amongst other features, however, flight path angle $\alpha$ is taken into account in order to provide a more accurate display of the terrain in the vicinity of the aircraft.

The following ranges of operation are now defined according to an embodiment of the invention, although one of ordinary skill in the art will understand how the methodology may be extended to cover situation involving a greater or lesser number of ranges of operation (the following example shows four ranges of operation):

(I) 'Red' Situation

In this situation, the aircraft 122 is flying with an altitude termed here an "effective altitude" $X_{eff}=X+\delta$ which leads to:

$$X_{eff} \leq Y+D$$

$$X+\delta \leq Y+D$$

where $\delta = Z \tan \alpha$, and finally $$X \leq Y+D-\delta$$

and where $\alpha$ is measured from the horizon and is positive for an ascent. This range of operation is termed the 'PREDICTIVE RED', and the same is indicated in FIG. 3A. As the above equation shows, a positive value of $\delta$ serves to decrease the sum $Y+D-\delta$, this leading to an overall lessening of the altitude at which the red alert would be caused. In other words, a positive $\alpha$, i.e. a positive flight path angle or ascent, leads to the red range of an aircraft encompassing a lesser number of features than before, as the "less high" features may no longer be displayed as a red area. Equivalently, it is less likely a given terrain feature will be displayed as being in the red range of an aircraft if the aircraft has a positive $\alpha$. The overall effect is to shift the red range to higher altitudes by an amount $\delta$, as shown in the figure.

In any case, at the bearing of the obstruction 124, the display screen 102 would display a first alert signal, such as a colored indication, e.g., a red area or set of pixels, at range Z. For this type of alert, an audible alert or alarm to be sounded to the pilot to accompany the visual alert if other criteria of the audible alert are satisfied, such as a calculated time-to-impact with a terrain feature being less than a predetermined threshold.

$\delta$, or equivalently $\alpha$, provides a more reliable indicator of the threat posed by the obstruction 124 as the calculation using $\delta$ or $\alpha$ predicts the altitude the aircraft 122 will have achieved when the aircraft is incident upon the obstruction, rather than always assuming level flight.

An example is now given as to how the above calculation may be applied. It will be clear to one of skill in the art, given the teaching of the above and below, how to apply the calculation to other scenarios, and in particular the scenarios below for the other ranges in this series. An aircraft is flying in level flight at 1,500' towards an obstruction 3 miles away having a height of 1000'. The elevation buffer is 1000', so a red area of warning is displayed as the appropriate condition is met, i.e., as X (1500') $\leq$ Y (1,000')+D (1,000')−$\delta$(Z tan $\alpha$, which is zero for level flight (flight path angle $\alpha$=0)) If, however, the aircraft is climbing at flight path angle 5°, then the calculation is now:

$$X \leq Y+D-\delta$$

$$\leq 1,000'+1,000'-3 \text{ miles } (5,280'/1 \text{ mile}) \tan 5°$$

$$\leq 2,000'-3 \text{ miles } (5,280'/1 \text{ mile}) \tan 5°$$

$$\leq 2,000'-1,386' \leq 614'$$

Here the condition is not met as X (1,500') is not less than or equal to 614'. Thus, the ascent at angle $\alpha$ has removed the red situation condition from the display screen 102 and the red area is no longer displayed.

(II) 'Yellow' Situation

In this situation, the aircraft 122 is flying with:

$$Y+D-\delta \leq X \leq Y+D+d_1-\delta,$$

where $\delta$ is defined as above for (I).

For X meeting the above condition, the display screen 102 would display a second alert signal, such as a colored indication of a yellow area or set of pixels, at range Z at the bearing of the obstruction 124. Again, the yellow range only encompasses higher terrain features than before, as some will have shifted to the green or black ranges as shown in the figure. In particular, and as above, the overall effect is to shift the yellow range to higher altitudes.

(III) 'Green' Situation

In this situation, the aircraft 122 is flying with:

$$Y+D+d_1-\delta \leq X_{\textit{eff}} \leq Y+D+d_1+d_2-\delta$$

For $X_{\textit{eff}}$ meeting the above condition, the display screen 102 would display a third alert signal, such as a colored indication of a green area, at range Z at the bearing of the obstruction 124. Analogously with the above, the green range only encompasses higher terrain features than before, as some will have shifted to the black range as shown in the figure.

(IV) 'Black' or 'No Colored Area' Situation

In this situation, the aircraft 122 is flying with:

$$Y+D+d_1+d_2-\delta \leq X_{\textit{eff}}$$

For $X_{\textit{eff}}$ meeting the above condition, the display screen 102 would display a black area at range Z at the bearing of the obstruction 124, or may alternatively display no color. In either case, the pilot would be undistracted by the display. That is, for such a terrain feature as the obstruction 124, the aircraft would be in no danger of collision.

FIG. 4 shows the above description and range definitions in the case where $\alpha$, and thus $\delta$ (=Z tan $\alpha$), are negative. The negative $\alpha$ thus shifts the red, yellow, and green terrain boundaries to lower altitudes, thus making it more likely a given terrain feature will cause an alert. In the extreme case shown in FIG. 4, the angle $\alpha$ is such that almost any terrain would fall within the red range.

Other refinements of this technique may be similarly applied. For example, at another level of sophistication, a second derivative may be applied to the calculation of $\delta$. In particular, it is clear from the above that the calculation of $\delta$ assumed a constant vertical flight path velocity, i.e., a constant first-derivative of vertical flight path. This type of calculation may well suit most flight paths; generally, for relatively small $\alpha$, the vertical flight path velocity may be assumed constant, at least over the short sampling time constant of the control electronics driving and monitoring this type of system. However, where this is not the case, consideration of the $2^{nd}$ derivative of flight path, or even higher order derivatives of flight path, may be added to the calculation to even further refine the estimate of $X_{\textit{eff}}$ relative to the surrounding terrain.

At another level of sophistication, many types of altitude displays may more preferably display range as a function of time, rather than of distance. In other words, rather than having the range of the display be, e.g., 10 miles, the range is displayed as, e.g., three minutes, or whatever time period would be required for the aircraft to traverse the 10 miles (in this example).

In this type of situation, the above calculations would be performed, but with the appropriate distances divided by the velocity or velocity component. For example, $T_z$, a time period associated with the range Z, would become the previous range, Z, divided by the lateral, i.e., non-vertical, component of velocity in the direction towards the particular obstruction. Similarly, $T_\delta$, the time period associated with the amount of ascent or descent $\delta$, would become the previous $\delta$ divided by the vertical component of velocity $v^\perp$.

In this scheme, the following definitions would apply ($T_{\textit{aircraft}}$ being the time available to the aircraft and pilot prior to incidence upon the obstruction):

(I) Red Situation $$T_{\textit{aircraft}} \leq (Y+D-\delta)/v^\perp$$

(II) Yellow Situation $$(Y+D-\delta)/v^\perp \leq T_{\textit{aircraft}} \leq (Y+D+d_1-\delta)/v^\perp$$

(III) Green Situation

In this situation, the aircraft 122 is flying with:

$$(Y+D+d_1-\delta)/v^\perp \leq T_{aircraft} \leq (Y+D+d_1+d_2-\delta)/v^\perp$$

(IV) Black or No Colored Area Situation $$(Y+D+d_1+d_2-\delta)/v^\perp \leq T_{aircraft}$$

Figure 5:
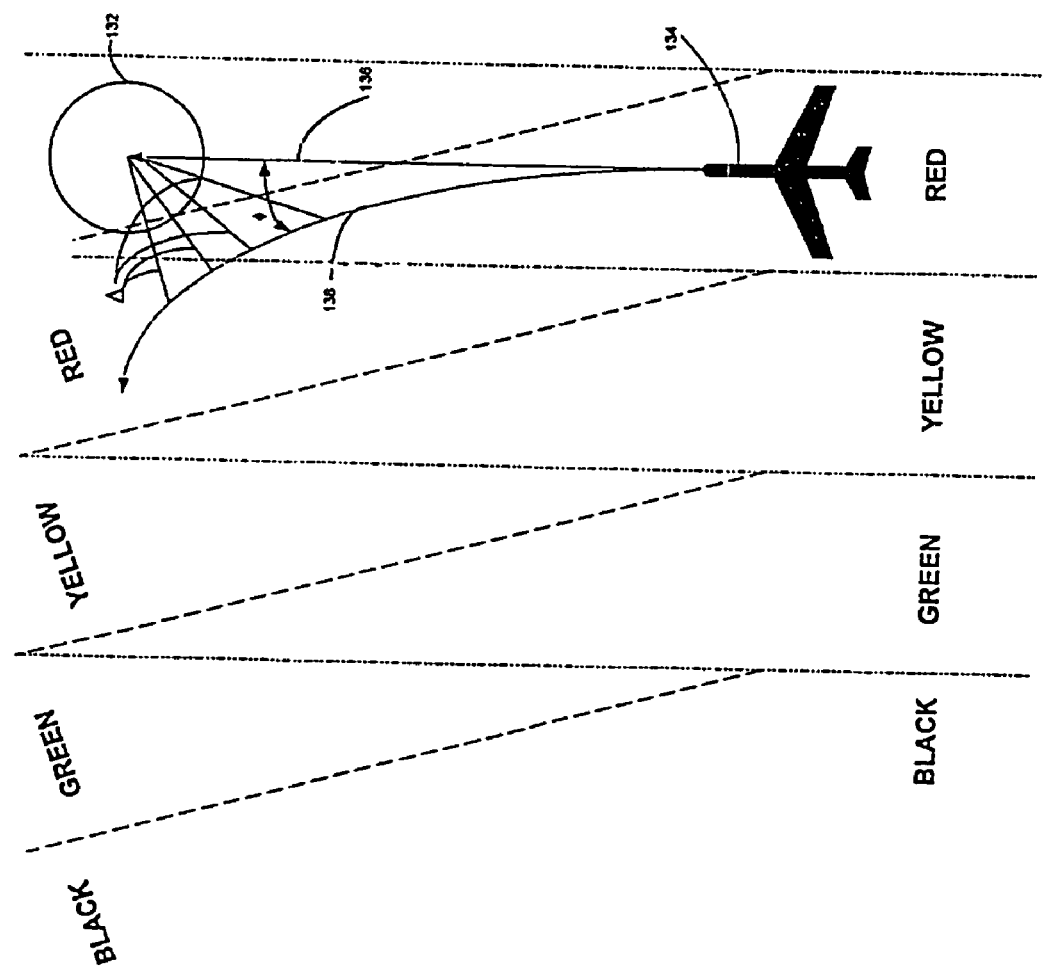
FIG. 5 is a schematic depiction of various scenarios of aircraft flight with respect to an obstruction, showing in particular the flight paths and accompanying alert situations according to an embodiment of the invention in which an aircraft has a positive yaw angle.

At another level of sophistication, and referring to FIG. 5, an azimuthal or yaw angle φ may also enter the calculation (see also FIG. 3B). In particular, it is defined here that an aircraft yaw angle φ changes the heading of the aircraft by the amount φ. The rate of change of the aircraft heading is identically dφ/dt. The yaw angle φ may be used in a fashion similar to the above to yield a more accurate calculation of the terrain faced by an aircraft.

Referring to FIG. 5, an aircraft 134 is initially along a flight path 136 towards an obstruction 132. Lateral red, yellow, green, and black zones may be defined, analogous to the vertical ones above, and the same are shown near the bottom of the figure. After a yaw rotation of φ to flight path 138, the colored zones are shifted. In this case, the obstruction 132 remains in the red zone but to a far less degree than previously.

The calculation to accomplish the displayed shift is analogous to the above. In this case, however, the lateral δ' which enters the computation may be calculated to first order by the yaw φ multiplied by the range Z. Similarly, for use in higher order computations, the lateral velocity may be calculated to first order by the yaw rate dφ/dt multiplied by the range Z.

In one embodiment of these calculations, the distance Δ between the obstruction and the projected flight path may be determined at a series of points along the flight path and the result signal can be based on this distance. If the distance is less than some predetermined number, the alert signal can be displayed as a red area with respect to the bearing of the obstruction.

Of course, the same will be performed automatically by the sensors inputting relevant data as the aircraft reorients its systems during a nonzero yaw. However, by having a separate data input for yaw angle, the resident software may update the information displayed automatically and more rapidly than waiting for GPS and database information to be updated via change of input data from sensors, i.e., as the aircraft heading changes.

It will be clear that the calculation and analysis above are the same no matter whether the aircraft is banking left or right, i.e., whether a positive or negative yaw is applied. Similarly, yellow, green, and black zones are present to the right of the aircraft, although these are not shown in FIG. 5 for the sake of clarity.

This calculation may be more complicated than the δ calculation above, as yaw may not typically be expected to be as constant as flight path angle. However, the technique may still be used to at least eliminate certain obstructions from causing alerts if the obstructions are clearly not dangers due to the nonzero aircraft yaw.

Figure 6:
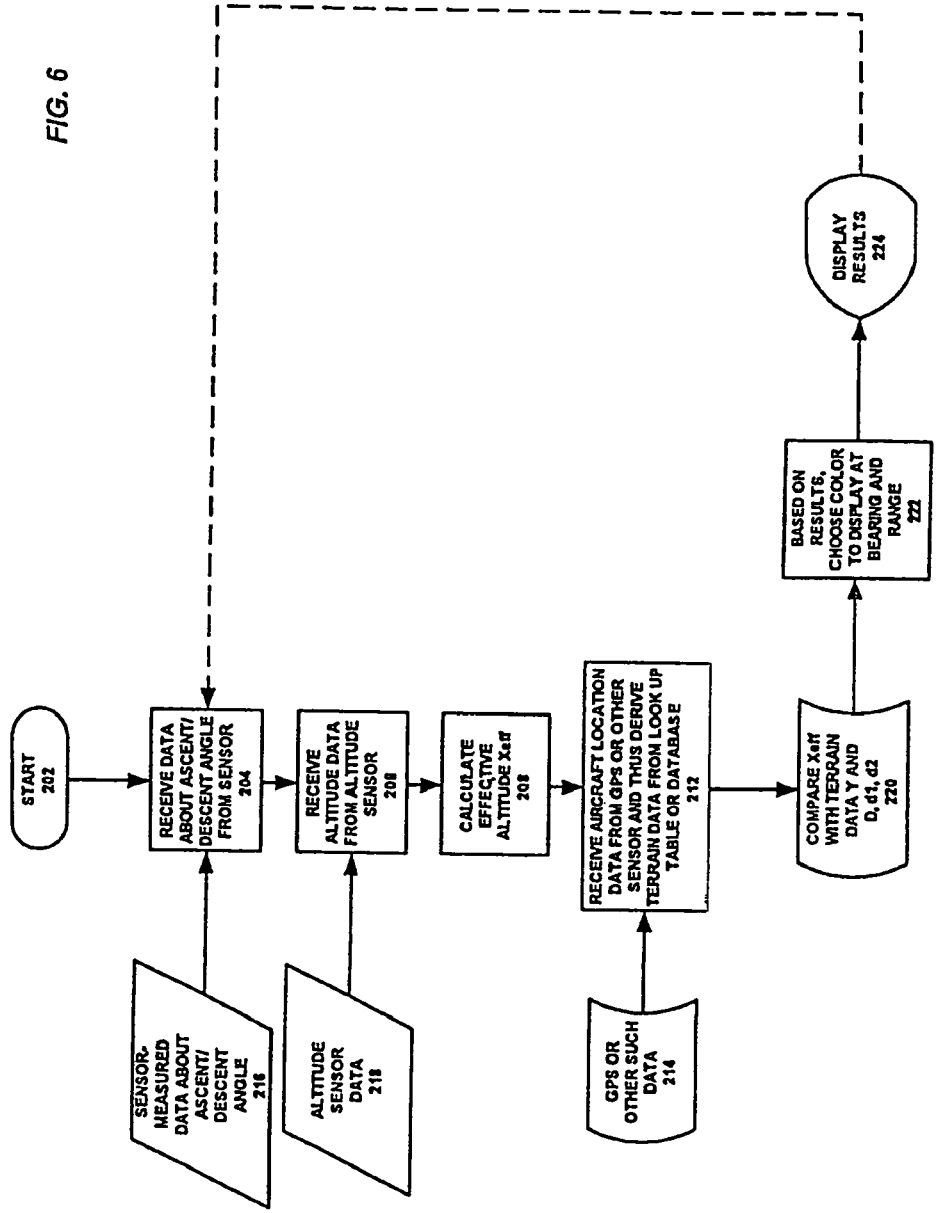
FIG. 6 is a flowchart of a method according to an embodiment of the present invention.

Referring to FIG. 6, a flowchart is shown embodying a method of the present invention. As shown, the method starts (step 202) and a sensor measures data about a flight path angle of ascent or descent (step 216). Of course, the same may well indicate, in the most general case, level flight. The system then receives this data (step 204). Altitude data (step 218) is then received from an altitude sensor, such as an altimeter (step 206). $X_{eff}$, i.e., the effective altitude of the aircraft at a point projected or predicted at each range point Z, may then be calculated (step 208).

Prior to, contemporaneous with, or after this calculation, a datum or data may be received regarding the known terrain. Such a first datum may be obtained in part by the aircraft location as determined by a navigation technique, such as GPS, or by another technique (step 214). In this way, a comparison of the aircraft location and height with known terrain features as received from a database or look-up table (step 212) may be performed. In other words, the local terrain may be compared to the effective altitude (step 220) to result in the color scheme (step 222) displayed to the pilot on the display screen 102 (step 224).

Of course, it will be noted that various steps may be taken out of the order given above. For example, the calculation of δ may well occur directly following the completion of steps 204 and 206. Similarly, steps 204 and 206 may occur in the given or the reverse order as described.

It should be noted that the above devices mentioned are not necessarily exclusive of those that can be used. The altimeter may be a radio altimeter, barometric altimeter, GPS, or any other type of altitude sensor or height indicator that may effectively measure the height of the aircraft, i.e., a third datum, for the calculation. Further, the calculation of δ may involve a computation employing the measured aircraft flight path, i.e., a fourth datum, as determined by GPS or other such sensors.

The calculation steps 208, 220, and 222 may occur by the process disclosed above and at the various levels of sophistication disclosed above. That is, the climbing or descending flight path angle may be the only factor considered, or higher order derivatives, as well as considerations of the yaw and its derivatives, may also be considered.

Figure 7:
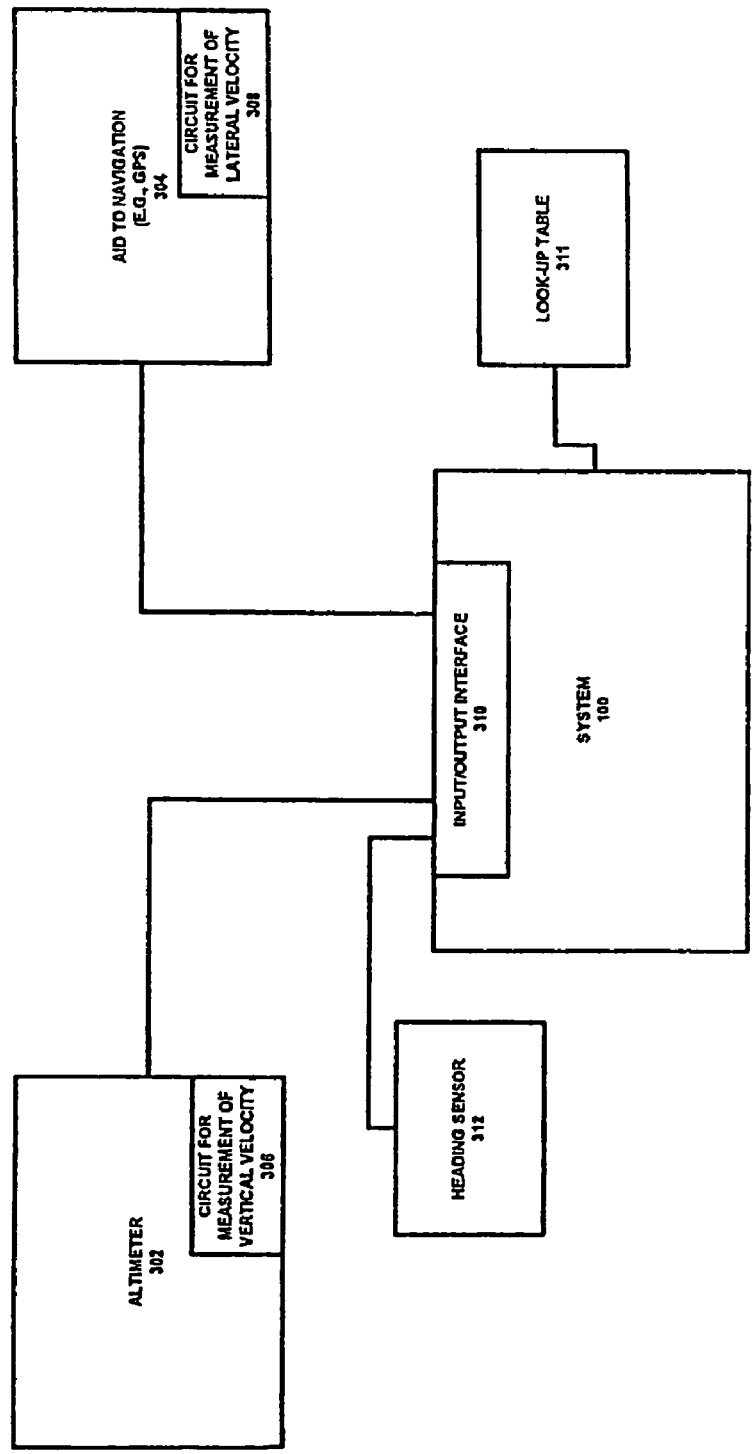
FIG. 7 is a block diagram of an apparatus according to an embodiment of the present invention.

Referring to FIG. 7, a system-level schematic is shown of a system that may embody the present invention. In particular, the predictive altitude display 100 may accept data inputs at an input/output interface 310 from at least instruments functioning as an altimeter 302, an aid to navigation 304, and a heading sensor 312, such as a compass. The input/output interface 310 is shown generally. The first through fourth inputs, i.e., altitude of an aircraft, location of the aircraft, height and location of obstructions, and aircraft flight path, respectively, may derive from a single device or from a combination of devices. The first through fourth inputs may further be input via the input/output interface 310 via being at least a portion of a parallel data bus or as a portion of a serial data stream.

The location of terrain may be achieved via comparison of the known aircraft location, as determined by, e.g., GPS, with the terrain features noted in that vicinity by a look-up table or database 311.

A measurement of the aircraft flight path V is then made either as a calculation by a circuit or software within the devices indicated above, or via separate devices. For example, many altimeters can also measure the vertical velocity component of flight path ($v^\perp$), or as shown in FIG. 3B, the component of flight path in the direction $x_3$, as the same is simply a first derivative of the altimeter measurement with respect to time. Also, many aids to navigation, such as certain GPS units, can also be employed to measure lateral flight path, i.e., the vector addition of the components $x_1$ and $x_2$ as shown in FIG. 3B, or, if desired by the calculation, the component of lateral flight path in the direction of a particular obstruction.

The compass 312 may be employed to measure the heading of the aircraft and to thus orient the display. Of course, given an appropriate measurement time, as is known, the aid to navigation 304 or a different device may also be used to measure the heading. As is clear from the teaching above, while the flight path measurements are shown in FIG. 5 as being within the altimeter 302 and the aid to navigation 304, the same may be measured outside of these subsystems.

The components of flight path, as well as the components of the aircraft location, can then be employed to perform embodiments of the method of the invention as described above. The same may calculate or generate a result signal, indicative of an effective altitude $X_{eff}$, also termed herein a projected height, of the aircraft at a location of an obstruction or indeed at any point within the range of the screen display. The result signal may then be used to derive the appropriate pixel color array for display to the pilot on the screen display.

The above description of a Method and Apparatus for Predictive Altitude Display is with respect to certain embodiments of the invention. While this description is capable of attaining the objects of the invention, the same is merely representative of the broad scope of the invention envisioned, and that numerous variations of the above embodiments may be known or may become known or are obvious or may become obvious to one of ordinary skill in the art, and these variations are fully within the broad scope of the invention. For example, while the forward arc has been defined here as an arc of 70°, other forward arc angles could also be used. Further, while finite values of elevation buffer have been described, an elevation buffer could be equal to zero in some circumstances. While the term "computer" has been employed in the specification, a general-purpose microprocessor driven computer is not necessary to run the programs or methods described here. A more limited chip design or circuit may be employed to run the same, and the same may be preferable due to the limited space available in standard avionics components. Accordingly, the scope of the invention is to be limited only by the claims appended hereto, and equivalents thereof. In these claims, a reference to an element in the singular is not intended to mean "one and only one" unless explicitly stated. Rather, the same is intended to mean "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for an apparatus or method to address each and every problem sought to be solved by the present invention, for it to be encompassed by the present claims. Furthermore, no element, component, or method step in the present invention is intended to be dedicated to the public regardless of whether the element, component, or method step is explicitly recited in the claims. No claim element herein is to be construed under the provisions of 35 U.S.C. §§112, ¶6, unless the element is expressly recited using the phrase "means for".

The invention claimed is:

1. A method for providing an indication of aircraft height relative to an obstruction in a terrain awareness warning system, comprising:
    receiving a first datum indicative of a feature of an obstruction;
    receiving a second datum indicative of a distance of the feature from an aircraft;
    receiving a third datum indicative of a height of the aircraft;
    receiving a fourth datum indicative of a speed of the aircraft;
    calculating a projected height of the aircraft at the location of the obstruction using the first through fourth data; and
    generating a result signal based on the projected height and the first datum.

2. The method of claim 1, wherein the first datum is a height of the obstruction.

3. The method of claim 1, wherein the receiving a fourth datum step further comprises: resolving the speed of the aircraft into components including a lateral speed and a vertical speed.

4. The method of claim 2, further comprising calculating a pitch angle of the aircraft from the received fourth datum.

5. The method of claim 4, further comprising calculating an effective altitude of the aircraft by adding to the third datum a value equal to the second datum multiplied by the tangent of the pitch angle.

6. The method of claim 5, further comprising generating a first alert signal if the effective altitude is less than the sum of the first datum and a safety elevation.

7. The method of claim 6, wherein the safety elevation is zero.

8. The method of claim 6, further comprising sounding an audible alarm as the first alert signal.

9. The method of claim 6, further comprising displaying a first colored indication at a display location corresponding to the second datum as the first alert signal.

10. The method of claim 9, wherein the colored indication is a red area.

11. The method of claim 5, further comprising generating a second alert signal if the effective altitude is greater than the sum of the first datum and a safety elevation but less then a sum of the first datum, the safety elevation, and a first distance.

12. The method of claim 11, further comprising displaying a second colored indication at a display location corresponding to the second datum as the second alert signal.

13. A computer program, stored in a machine-readable format, for a terrain awareness warning system, for causing a computer to:
    receive a first datum indicative of a feature of an obstruction;
    receive a second datum indicative of a distance of the feature from an aircraft;
    receive a third datum indicative of a height of the aircraft;
    receive a fourth datum indicative of a speed of the aircraft;
    calculate a projected height of the aircraft at the location of the obstruction using the first through fourth data; and
    generate a result signal based on the projected height and the first datum.

14. A apparatus for providing an indication of aircraft height relative to an obstruction in a terrain awareness warning system, comprising:
    a first input for a first signal from an instrument measuring a height of an aircraft;
    a second input for a second signal from an instrument measuring a location of the aircraft;
    a third input for a third signal from an instrument providing information about features of terrain surrounding the aircraft;
    a fourth input for a fourth signal from an instrument measuring a speed of the aircraft; and
    means for employing the signals from the first through fourth inputs to calculate an effective height of the aircraft relative to at least the third input.

15. The apparatus of claim 14, wherein the instrument measuring a height of the aircraft and the instrument measuring a location of the aircraft is an altimeter and wherein the instrument providing information about geographic features of terrain surrounding the aircraft and the instrument measuring a speed of the aircraft is an aid to navigation.

16. The apparatus of claim 15, wherein the aid to navigation is a global positioning system unit.

17. The apparatus of claim 14, wherein the first through fourth inputs form at least a portion of a parallel data bus.

18. The apparatus of claim 14, wherein the first though fourth inputs form at least a portion of a serial data stream.

19. A method of performing terrain awareness warning for an aircraft, comprising:
    collecting data of obstructions in the vicinity of an aircraft;
    collecting data of the distance and bearing of the obstructions from the aircraft;
    collecting data of the height and speed of the aircraft;
    calculating a projected height of the aircraft at the location of each of the obstructions based on the collected data of the height and speed of the aircraft;
    generating result signals based on the projected height, the collected data of obstructions, and the bearing of the obstructions; and
    displaying indications on a display screen with respect to bearing based on the generated result signals.

20. A method for providing an indication of lateral aircraft position relative ot an obstruction in a terrain awareness warning system, comprising:
    receiving a first datum indicative of a bearing of an obstruction relative to an aircraft;
    receiving a second datum indicative of a distance of the obstruction from the aircraft;
    receiving third datum indicative of a speed of the aircraft;
    calculating a projected flight path of the aircraft relative to the obstruction using the first through third data and determining a distance between the projected flight path and the obstruction at a series of points along the projected flight path; and
    generating a result signal based on the determined distance.

* * * * *

UNITED STATES PATENT AND TRADEMARK OFFICE
CERTIFICATE OF CORRECTION

PATENT NO. : 7,057,549 B2  
APPLICATION NO. : 11/076794  
DATED : June 6, 2006  
INVENTOR(S) : Gearld J. Block It is certified that error appears in the above-identified patent and that said Letters Patent is hereby corrected as shown below:

Col. 6, lines 3 and 4, change last word beginning on line 3 from "look-ahead", to -- look ahead --.

Col. 6, line 5, after "desired" change "look ahead" to -- look-ahead --.

Col. 6, line 7, change "look-head" to -- look-ahead --.

Col. 11, line 20, before "numerous" delete "that".

Claim 20, Col. 14, line 7, after "relative" change "ot" to -- to --.

Signed and Sealed this

Twenty-first Day of November, 2006

JON W. DUDAS  
*Director of the United States Patent and Trademark Office*